(12) United States Patent
Shin et al.

(10) Patent No.: US 8,931,946 B2
(45) Date of Patent: Jan. 13, 2015

(54) OPTICAL SHEET AND BACKLIGHT ASSEMBLY INCLUDING THE OPTICAL SHEET

(71) Applicant: Samsung Display Co., Ltd., Yongin, Gyeonggi-Do (KR)

(72) Inventors: Chul Shin, Busan (KR); Sungmu Kim, Ansan-si (KR); Geun-kyu Song, Cheonan-si (KR); Myung-Ho Won, Seoul (KR); Seok-Kun Yoon, Seoul (KR); Sang-Won Lee, Asan-si (KR)

(73) Assignee: Samsung Display Co., Ltd. (KR)

( * ) Notice: Subject to any disclaimer, the term of this patent is extended or adjusted under 35 U.S.C. 154(b) by 51 days.

(21) Appl. No.: 13/769,116

(22) Filed: Feb. 15, 2013

(65) Prior Publication Data

US 2014/0104872 A1    Apr. 17, 2014

(30) Foreign Application Priority Data

Oct. 16, 2012 (KR) .................. 10-2012-0115015

(51) Int. Cl.
| | | |
|---|---|---|
| *F21V 7/04* | (2006.01) | |
| *G06K 19/06* | (2006.01) | |
| *F21V 8/00* | (2006.01) | |
| *G09F 13/04* | (2006.01) | |
| *G09F 13/18* | (2006.01) | |

(52) U.S. Cl.
CPC .............. *G06K 19/06* (2013.01); *G02B 6/0051* (2013.01); *G09F 13/04* (2013.01); *G09F 13/18* (2013.01)
USPC ........................... 362/633; 362/97.4; 362/607

(58) Field of Classification Search
CPC .. G02B 6/0051; G02B 6/0053; G02F 1/1333; G02F 1/157; G02F 1/133608; G02F 2001/133314; G02F 2001/133317; G02F 2001/13332; G02F 2001/133322; G09F 13/04
USPC .............. 362/6, 31, 607, 97.1, 330, 632–634, 362/561, 606–608, 97.4; 349/62–65, 349/187–192, 58–60
See application file for complete search history.

(56) References Cited

U.S. PATENT DOCUMENTS

| | | | |
|---|---|---|---|
| 7,125,153 | B2 | 10/2006 | Huang et al. |
| 7,530,711 | B2 | 5/2009 | Bang |
| 7,583,353 | B2 * | 9/2009 | Kujiraoka ..................... 349/187 |
| 7,724,316 | B2 | 5/2010 | Maruyama et al. |
| 7,772,776 | B2 * | 8/2010 | Kim et al. ..................... 313/587 |
| 2004/0056993 | A1 * | 3/2004 | Kim et al. ..................... 349/110 |
| 2006/0007367 | A1 * | 1/2006 | Cho ................................ 349/58 |
| 2006/0147175 | A1 * | 7/2006 | Shinohara ..................... 385/146 |
| 2010/0108512 | A1 * | 5/2010 | Hattori .......................... 204/452 |

FOREIGN PATENT DOCUMENTS

| | | |
|---|---|---|
| JP | 2002-202504 | 7/2002 |
| JP | 2006-071685 | 3/2006 |
| KR | 10-2007-0060270 | 6/2007 |
| KR | 10-0796639 | 1/2008 |
| KR | 10-2008-0049570 | 6/2008 |
| KR | 10-2008-0089008 | 10/2008 |

* cited by examiner

Primary Examiner — Jason Moon Han
(74) Attorney, Agent, or Firm — Innovation Counsel LLP (57) ABSTRACT

A set of optical sheets may perform at least one of diffusion, refraction, and condensation of light. The set of optical sheets may include a first optical sheet that includes a first base film and a first distinction unit disposed outside the first base film. The set of optical sheets may further include a second optical sheet that includes a second base film and a second distinction unit disposed outside the second base film. The second distinction unit may be spaced from the first distinction unit in a plan view of the set of optical sheets if the second base film complete overlaps the first base film.

5 Claims, 9 Drawing Sheets

OPTICAL SHEET AND BACKLIGHT ASSEMBLY INCLUDING THE OPTICAL SHEET

CROSS-REFERENCE TO RELATED APPLICATIONS

This U.S. non-provisional patent application claims priority under 35 USC §119 to and benefit of Korean Patent Application No. 10-2012-0115015, filed on Oct. 16, 2012, the prior application being incorporated herein by reference.

BACKGROUND OF THE INVENTION

The present invention is related to optical sheets and backlight assemblies that include optical sheets.

Display devices may be classified into active type display devices, such as an organic light emitting display device, and passive type display devices, such as a liquid crystal display device. Since a display panel of a passive type display device typically does not generate light, the passive type display device requires a backlight assembly to provide light to the display panel.

A backlight assembly may include a light source, a light guide panel, and a plurality of optical sheets. The optical sheets serve to diffuse and condense incident light.

Since conventional optical sheets have the same shape, it is difficult for workers to clearly distinguish different optical sheets when assembling display devices. As a result, the arrangement orders of some optical sheets may be incorrect in some display devices, which may not function properly.

SUMMARY OF THE INVENTION

One or more embodiments of the invention may be related a set of optical sheets may perform at least one of diffusion, refraction, and condensation of light. The set of optical sheets may include a first optical sheet that includes a first base film and a first distinction unit disposed outside the first base film. The set of optical sheets may further include a second optical sheet that includes a second base film and a second distinction unit disposed outside the second base film. The second distinction unit may be spaced from the first distinction unit in a plan view of the set of optical sheets if the second base film complete overlaps the first base film. The first distinction unit and the second distinction unit may advantageously facilitate verification of the selection and the arrangement of the set of optical sheets.

In one or more embodiments, the first optical sheet may further include a first guide unit. The first guide unit may abut a first side of the first base film. The first distinction unit may be disposed on the first guide unit. The second optical sheet may further include a second guide unit. The second guide unit may abut a first side of the second base film that corresponds to the first side of the first base film. The second distinction unit may be disposed on the second guide unit. The second guide unit may overlap the first guide unit if the second base film complete overlaps the first base film. The first side of the second base film may overlap the first side of the first base film if the second base film complete overlaps the first base film.

In one or more embodiments, the first distinction unit may abut a first side of the first base frame. The second distinction unit may abut a first side of the second base frame that corresponds to the first side of the first base frame.

One or more embodiments of the invention may be related to a backlight assembly that may include a chassis and a light unit disposed inside the chassis. The light unit may include one or more of a light guide and a light source. The backlight assembly may further include a first optical sheet overlapping the light unit for receiving light from the light unit. The first optical sheet may include a first base film and a first distinction unit disposed outside the first base film. The first optical sheet may be configured for performing at least one of diffusing the light, refracting the light, and condensing the light. The backlight assembly may further include a second optical sheet. The second optical sheet may include a second base film and a second distinction unit disposed outside the second base film. The second base film may complete overlap the first base film. The second distinction unit may be spaced from the first distinction unit in a plan view of the backlight assembly.

In one or more embodiments, the first optical sheet may further include a first guide unit. The first guide unit may abut a first side of the first base film. The first distinction unit may be disposed on the first guide unit. The second optical sheet may further include a second guide unit. The second guide unit may abut a first side of the second base film that corresponds to the first side of the first base film. The second distinction unit may be disposed on the second guide unit. The second guide unit may overlap the first guide unit.

In one or more embodiments, the second guide unit may be translucent, and a luminosity of the first distinction unit may appear to be less than a luminosity of the second distinction unit given that the second guide unit overlaps the first guide unit.

In one or more embodiments, the chassis may include a first sidewall. The first sidewall may have a first recess. The first guide unit and the second guide unit may be disposed inside the first recess.

In one or more embodiments, the chassis may include a second sidewall disposed perpendicular to the first sidewall. The second sidewall may have a second recess. The first optical sheet may further include a first coupling unit. The first coupling unit may abut the first base film.

The second optical sheet may further include a second coupling unit. The second coupling unit may abut the second base film. The first coupling unit and the second coupling unit may be disposed inside the second recess.

In one or more embodiments, the first coupling unit may have a first hole. The second coupling unit may have a second hole. The chassis may further include a projection disposed inside the second recess. The projection may be disposed through the first hole and the second hole.

In one or more embodiments, the backlight assembly may include a frame that may overlap edges of the first optical sheet and may overlap edges of the second optical sheet. The frame may have an opening that may expose the first distinction unit and the second distinction unit.

In one or more embodiments, the backlight assembly may include a frame that may partially cover the first guide unit and the second guide unit. The frame may have an opening that may expose the first distinction unit and the second distinction unit.

In one or more embodiments, the first distinction unit may abut a first side of the first base film. The first optical sheet may further include a guide unit disposed outside the first base film, abutting a second side of the first base film, and disposed opposite the first distinction unit. The second side of the first base film may be position opposite the first side of the first base film. The frame may completely cover the guide unit.

In one or more embodiments, each of the first distinction unit and the second distinction unit may include at least one of a number, a character, a color, and a barcode.

In one or more embodiments, the backlight assembly may include a third optical sheet. The third optical sheet may include a third base film and a third distinction unit disposed outside the third base film. The third base film may complete overlap the second base film. The second base film may be disposed between the first base film and the third base film. The second distinction unit may be disposed between the first distinction unit and the third distinction unit in the plan view of the backlight assembly.

In one or more embodiments, the first distinction unit may abut a first side of the first base frame. The second distinction unit may abut a first side of the second base frame that corresponds to the first side of the first base frame. The first side of the second base frame may overlap and/or may be aligned with the first side of the first base frame.

In one or more embodiments, the chassis may include first sidewall. The first sidewall may have a first recess, a second recess, and a third recess disposed between the first recess and the second recess. The first distinction unit may be disposed inside the first recess. The second distinction unit may be disposed inside the second recess. No distinction unit is disposed inside the third recess.

In one or more embodiments, the first sidewall may include a first sign disposed adjacent to the first recess, a second sign disposed adjacent to the second recess, and a third sign disposed adjacent to the third recess.

In one or more embodiments, a value of the first sign may be greater than a value of the third sign, and the value of the third sign may be greater than a value of the second sign.

In one or more embodiments, the backlight assembly may include a frame that may completely cover the first recess, the second recess, the third recess, the first distinction unit, and the second distinction unit.

In one or more embodiments, the backlight assembly may include a third optical sheet. The third optical sheet may include a third base film and a third distinction unit abutting a first side of the third base film that corresponds to the first side of the second base film. The third base film may complete overlap the second base film. The second base film may be disposed between the first base film and the third base film. The second distinction unit may be disposed between the first distinction unit and the third distinction unit in the plan view of the backlight assembly.

One or more embodiments of the invention may be related to an optical sheet. The optical sheet may include a base film, a guide unit, and a distinction unit. The base film may diffuse, refract, or condense incident light. The guide unit may be provided in one or plurality and protrudes at a first side surface of the base film. The distinction unit may be marked as a sign in a partial area of the guide unit.

In one or more embodiments, the sign may be any one of a number, a character, a color, and a barcode.

One or more embodiments of the invention may be related to a backlight assembly. The backlight assembly may include a light source, a light guide panel, a first optical sheet, a second optical sheet, a bottom chassis, and a mold frame.

In one or more embodiments, the light guide panel may guide light provided from the light source and may emit the guided light upwardly.

In one or more embodiments, the first optical sheet may be disposed on the light guide panel, and a first sign may be marked on the optical sheet.

In one or more embodiments, the second optical sheet may be disposed on the first optical sheet, and a second sign different from the first sign may be marked on the second optical sheet.

In one or more embodiments, the bottom chassis may have a storage space for receiving the light source, the light guide panel, the first optical sheet, and the second optical sheet in the storage space.

In one or more embodiments, the mold frame may cover at least a portion of the edges of the first optical sheet and the second optical sheet. The mode frame may have an opening exposing the first sign and the second sign.

In one or more embodiments, the first optical sheet may include a first base film and a first guide unit providing at a side surface of the first base film. The first sign may be marked in a partial area of the first guide unit.

In one or more embodiments, the second optical sheet may include a second base film and a second guide unit protruding at a side surface of the second base film. The second guide unit may overlap the first guide unit. The second sign may be marked in a partial area of the second guide unit and spaced apart from the first sign in a plan view of the backlight assembly.

In one or more embodiments, the backlight assembly may include a plurality of optical sheets that may include a first optical sheet and a second optical sheet.

In one or more embodiments, the first optical sheet may include a first guide unit, and the second optical sheet may include a second guide unit. The first and second guide units may be spaced apart from each other in a plan view of the backlight assembly.

In one or more embodiments, signs may be marked in a partial area of a top surface of the bottom chassis. The signs may be marked adjacent to the guide units.

BRIEF DESCRIPTION OF THE DRAWINGS

Embodiments of the invention will become more apparent in view of the attached drawings and accompanying detailed description. The embodiments depicted therein are provided by way of example, not by way of limitation, wherein like reference numerals may refer to the same or similar elements. The drawings are not necessarily to scale, emphasis instead being placed upon illustrating aspects of the invention.

DETAILED DESCRIPTION

The advantages and features of the invention will be apparent from embodiments described in detail with reference to the accompanying drawings. It should be noted, however, that the invention is not limited to embodiments discussed in the description; the invention may be implemented in various forms. The embodiments are provided to disclose examples of the invention and to let those skilled in the art understand the nature of the invention.

Although the terms first, second, third etc. may be used herein to describe various signals, elements, components, regions, layers, and/or sections, these signals, elements, components, regions, layers, and/or sections should not be limited by these terms. These terms may be used to distinguish one signal, element, component, region, layer, or section from another signal, region, layer or section. Thus, a first signal, element, component, region, layer, or section discussed below may be termed a second signal, element, component, region, layer, or section without departing from the teachings of the present invention. The description of an element as a "first" element may not require or imply the presence of a second element or other elements. The terms first, second, third, etc. may also be used herein to differentiate different categories of elements. For conciseness, the terms first, second, etc. may represent first-type (or first-category), second-type (or second-category), etc., respectively.

Figure 1:
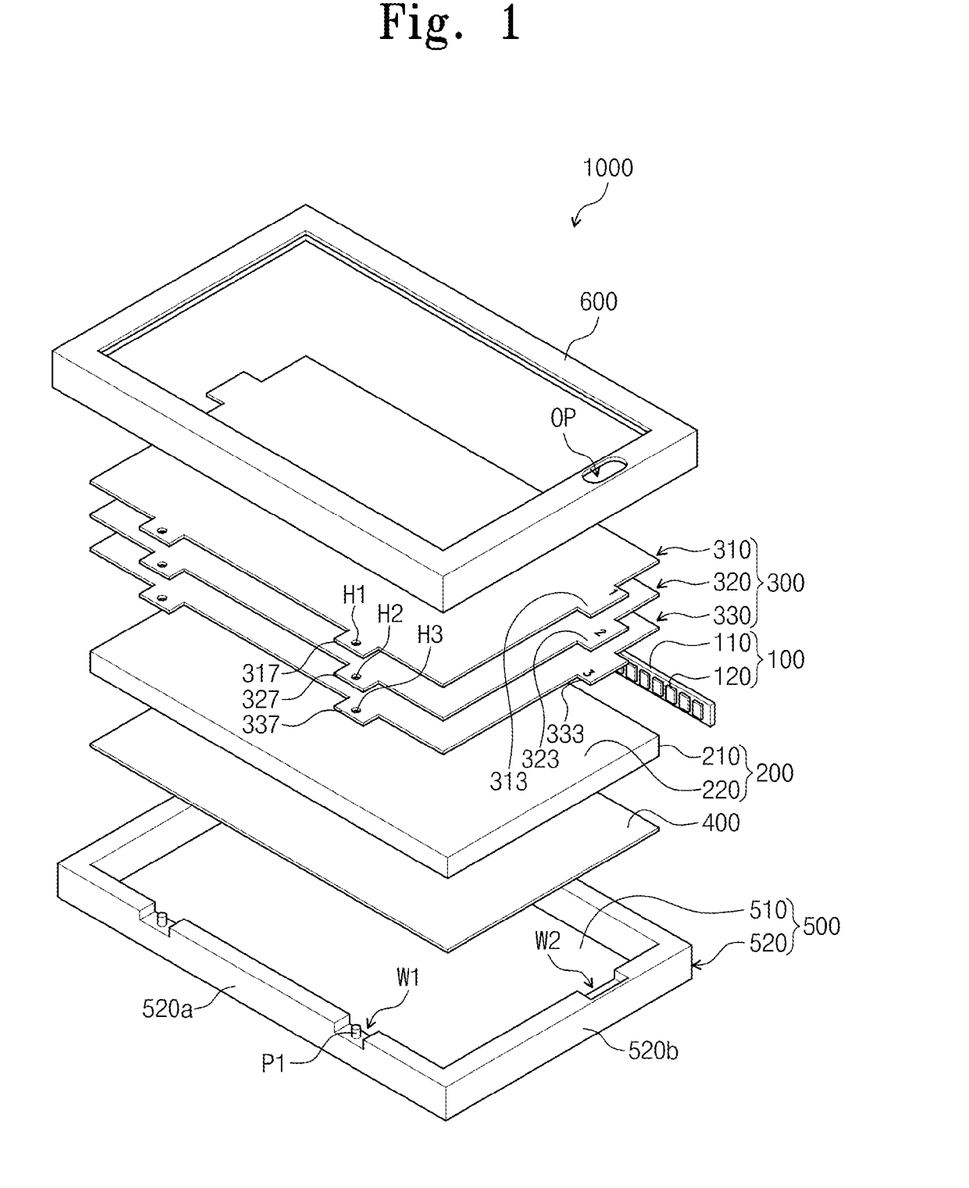
FIG. 1 illustrates an exploded perspective view of a backlight assembly according to one or more embodiments of the invention.
Figure 2:
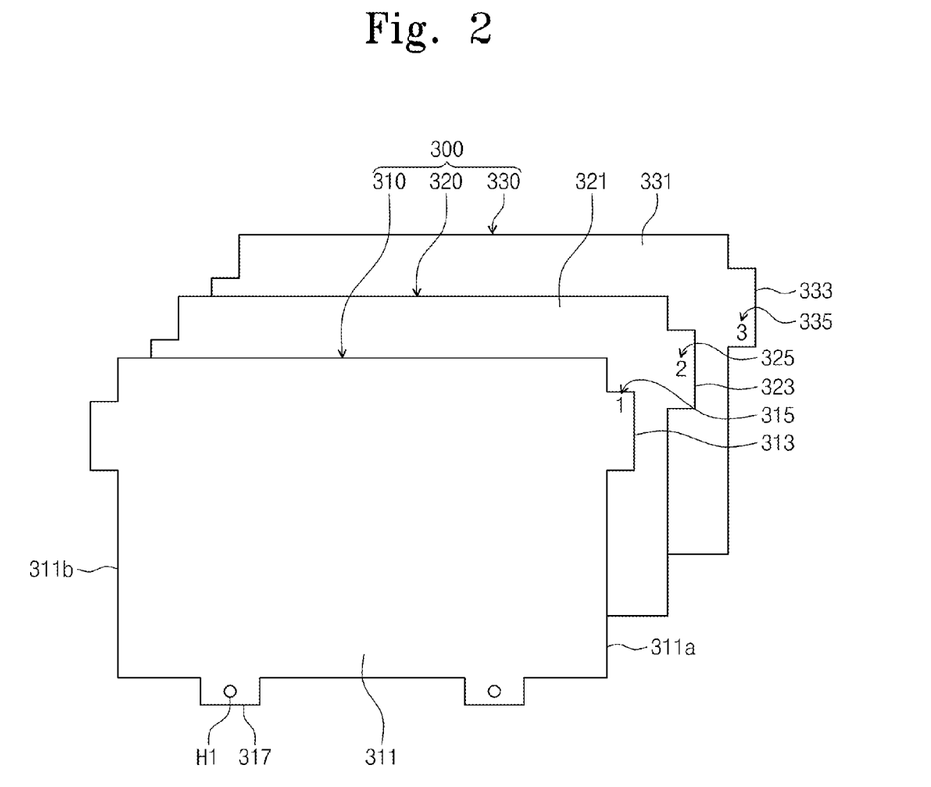
FIG. 2 illustrates a top plan view of optical sheets illustrated in FIG. 1.
Figure 3:
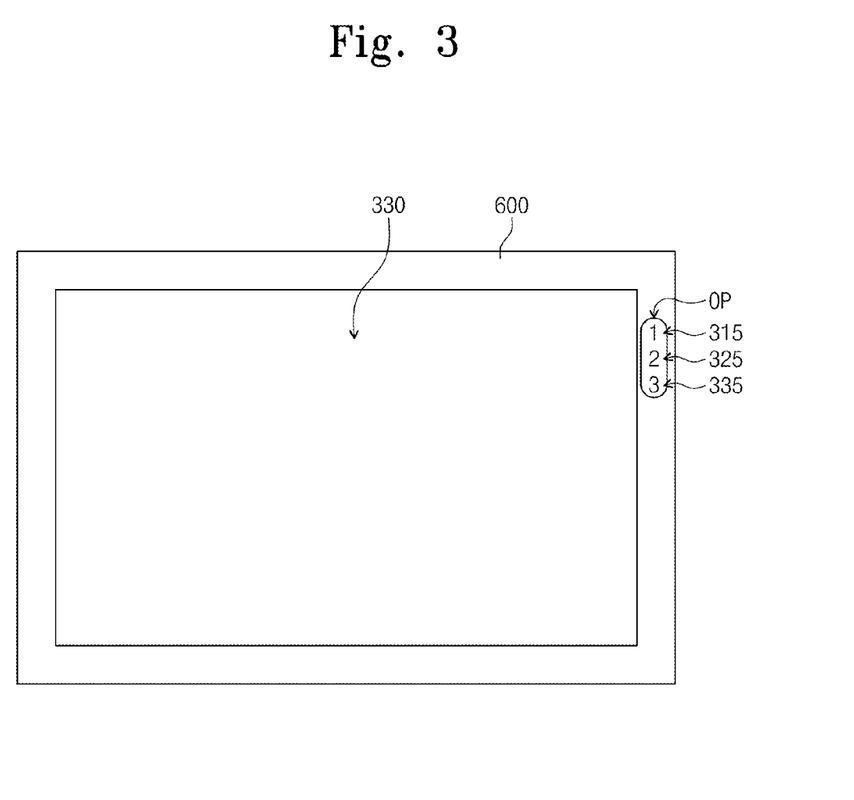
FIG. 3 illustrates a top plan view showing a combination of a mold frame and the optical sheets illustrated in FIG. 1.

FIG. 1 illustrates an exploded perspective view of a backlight assembly 1000 according to one or more embodiments of the invention. FIG. 2 illustrates a top plan view of optical sheets illustrated in FIG. 1. FIG. 3 illustrates a top plan view showing a combination of a mold frame and the optical sheets illustrated in FIG. 1.

Referring to FIG. 1, the backlight assembly 1000 includes a light source unit 100, a light guide panel 200, optical sheets 300, a reflection plate 400, a bottom chassis 500, and a mold frame 600.

The light source unit 100 includes a printed circuit board (PCB) 110 and a light source 120. The PCB 110 may receive power from an external source for driving the light source 120. The light source 120 may represent one or a plurality of light emitting units. The light source 120 is mounted on the PCB 110 and may receive the power from the PCB 110 to emit light. The light source 120 may include a light emitting diode (LED).

In one or more embodiments, the light source 120 may include a light emitting diode (LED). In one or more embodiments, the light source 120 may include a cold cathode fluorescent lamp (CCFL) and/or a flat fluorescent lamp (FEL).

In one or more embodiments, the backlight assembly 1000 may include one light source unit 100, as illustrated in FIG. 1. In one or more embodiments, the number of light sources 100 may include two or more light source units 100. In one more embodiments, as illustrated in FIG. 1. the light source unit 100 may be an edge-type light source unit and may correspond to a side surface of the light guide panel 200. In one or more embodiments, the light source unit 100 may alternatively or additionally correspond to one or more other surfaces of the light guide panel 200.

The light guide panel 200 may include an incident surface 210 and an emitting surface 220. Light emitted from the light source 120 may impinge on the incident surface 210, may be guided by the light guide panel, and may be emitted through the emitting surface 220. In one more embodiments, the light guide panel 200 may have a tetragonal shape.

The optical sheets 300 may be disposed on the light guide panel 200 to change and/or improve characteristics of the light emitted from the light guide panel 200.

The optical sheets 300 may include three sheets: a first optical sheet 310, a second optical sheet 320, and a third optical sheet 330. The first optical sheet 310 may be a diffusion sheet, the second optical sheet 320 may be a prism sheet, and the third optical sheet 330 may be a condensing sheet.

In one or more embodiments, the backlight assembly 1000 and/or the optical sheets 300 may include at most two optical sheets or may include four or more optical sheets, if necessary.

The first optical sheet 310 may include a first base film 311, a first guide unit 313, and a first distinction unit 315.

The first base film 311 may overlap the light guide panel 200 and may diffuse light provided from the light guide panel 200. The first base film 311 may include a rectangular area that includes four sides, including a side 311a and a side 311b.

At least one first-optical-sheet guide unit 313 (or first guide unit 313 for conciseness) may be disposed at (e.g., may protrude from and/or may abut) at least one of the sides 311a and 311b of the first base film 311. In one or more embodiments, as illustrated in FIGS. 1 and 2, two first guide units 313 may be disposed at and may protrude from the two opposite sides 311a and 331b of the first base film 311. A first guide unit 313 may match (and/or may be disposed inside) a corresponding structure of the bottom chassis 500 (e.g., a recess W2) to secure the first optical sheet 310 in place.

A first distinction unit 315 may include a first sign marked in a partial area of a first guide unit 313. In one or more embodiments, the first sign may be a number or a character. In one or more embodiments, as illustrated in FIGS. 1 and 2, the first sign may be a number '1'.

The first optical sheet 310 may further include at least one first-optical-sheet coupling unit 317 (or first coupling unit 317 for conciseness). The first coupling unit 317 may be disposed at (e.g., may protrude from and/or may abut) a side of the first base film 311 that is different from at least one of the sides 311a and 311b of the first base film 311, where at least one first guide unit 313 is disposed. A first coupling hole H1 is formed at the first coupling unit 317. The first coupling unit 317 may match (and/or may be disposed inside) a corresponding structure of the bottom chassis 500 (e.g., a recess W1) with the first coupling hole H1 matching (and/or receiving) a corresponding element of the bottom chassis 500 (e.g., a coupling projection P1) to secure the first optical sheet 310 in place.

The second optical sheet 320 includes a second base film 321, a second guide unit 323, a second distinction unit 325, and a second coupling unit 327. The third optical sheet 330 includes a third base film 331, a third guide unit 333, a third distinction unit 335, and a third coupling unit 337.

The second optical sheet 320 and the third optical sheet 330 have the same shape as the first optical sheet 310, except for the distinction units 325 and 335. Hereinafter, the distinction units 325 and 335 will be further explained.

The second distinction unit 325 may include a second sign marked in a partial area of the second guide unit 323, wherein the second sign may be perceivably different from the first sign. When the second optical sheet 320 overlaps the first optical sheet 310 in the backlight assembly 1000, the second sign may not overlap the first sign and may be spaced from the first sign in a top view of the backlight assembly 1000. That is, the position of the first sign on the first guide unit 313 does not correspond to the position of the second sign on the second guide unit 323. In one or more embodiments, as illustrated in FIGS. 1 and 2, the second sign may be a number '2'.

The third distinction unit 335 may include a third sign marked in a partial area of the third guide unit 333, wherein the third sign may be perceivably different from each of the first sign and the second sign. When the third optical sheet 323 overlaps the second optical sheet 320 and overlaps the first optical sheet 310 in the backlight assembly 1000, the third sign may not overlap either of the first sign and the second sign and may be spaced from each of the first sign and the second sign in a top view of the backlight assembly 1000. That is, the position of the third sign on the third guide unit 333 does not correspond to the position of the second sign on the second guide unit 323 and does not correspond to the position of the first sign on the first guide unit 313.r In one or more embodiments, as illustrated in FIGS. 1 and 2, the third sign may be a number '3'.

In one or more embodiments, the distinction units 315, 325, and 335 have the same luminosity and saturation. In one or more embodiments, the optical sheets 310, 320, and 330 may be made of a substantially transparent material. In one or more embodiments, the optical sheets 310, 320, and 330 and/or the guide units 313, 323, and 333 may be made of a material that is translucent, is not fully transparent, and has a significant haze value.

When a worker views a stack with the first optical sheet 310 disposed under the second optical sheet 320 and with the second optical sheet 320 disposed under the third optical sheet 330, the haze value of the guide units 313, 323, and 333 allows the distinction units 315, 325, and 335 to be perceived with different luminosities by the worker. Specifically, assuming that $L_1$, $L_2$, and $L_3$ represent the luminosities of the distinction units 315, 325, and 335, respectively, perceived by the worker, given that the first distinction unit 315 is disposed under and hazed by the guide units 323 and 333, and given that the second distinction unit 325 is disposed under and haze by the third guide 333, the relationship of the luminosities $L_1$, $L_2$, and $L_3$ may be $L_1 < L_2 < L_3$. Thus, the worker may confirm that correct optical sheets have been installed and may confirm that the optical sheets 310, 320, and 330 have been stacked in the correct order.

The reflection plate 400 is disposed below the light guide panel 200 to reflect leaked light, which has been emitted from the light source unit 100 and has not been substantially transmitted toward the optical sheets 300, toward the optical sheets 300.

The bottom chassis 500 includes a bottom surface 510 and sidewalls 520 oriented substantially perpendicular to the bottom surface 510. The bottom chassis 500 has a storage space formed by the bottom surface 510 and the sidewalls 520. The bottom chassis 500 may receive and/or may contain the light source unit 100, the light guide panel 200, the optical sheets 300, and the reflection plate 400 inside the storage space.

A first recess W1 may be formed on a top surface of a sidewall 520a of the bottom chassis 500 and may correspond to the coupling units 317, 327, and 337 for receiving the coupling units 317, 327, and 337. The coupling units 317, 327, and 337 may be sequentially disposed inside the first recess W1. A coupling projection P1 may be formed at the first recess W1 and may correspond to the coupling holes H1, H2, and H3. The coupling projection P1 may be inserted into (and inserted through) the coupling holes H1, H2, and H3 sequentially.

A second recess W2 may be formed on a top surface of a sidewall 520b of the bottom chassis 500, wherein the sidewall 520b of the bottom chassis 500 may be disposed substantially perpendicular to the sidewall 520a of the bottom chassis 500. The second recess W2 may correspond to the guide units 313, 323, and 333 for receiving the guide units 313, 323, and 333. The guide units 313, 323, and 333 may be sequentially disposed inside the second recess W2.

Referring to FIGS. 1 to 3, the mold frame 600 may be disposed on the optical sheets 300 and may match the bottom chassis to secure the light source unit 100, the light guide panel 200, the optical sheets 300, and the reflection plate 400 inside the bottom chassis 500.

The mold frame 600 may have a form of a tetragonal or rectangular ring.

The mold frame 600 may overlap at least edge portions of the optical sheets 300. In one or more embodiments, the mold frame 600 may at least partially overlap the guide units 313, 323, and 333 except the distinction units 315, 325, and 335 and may cover the coupling units 317, 327, and 337.

The mold frame 600 may have an opening OP for exposing the first distinction unit 315, the second distinction unit 325, and the third distinction unit 335. The worker may check the distinction units 315, 325, and 335 through the opening OP to determine whether the optical sheets 300 have been disposed inside the bottom chassis and whether the stack order of the optical sheets 300 is correct. Advantageously, according to embodiments of the invention, likelihood of malfunction of display devices caused by incorrect assembly of optical sheets may be minimized.

Figure 4:
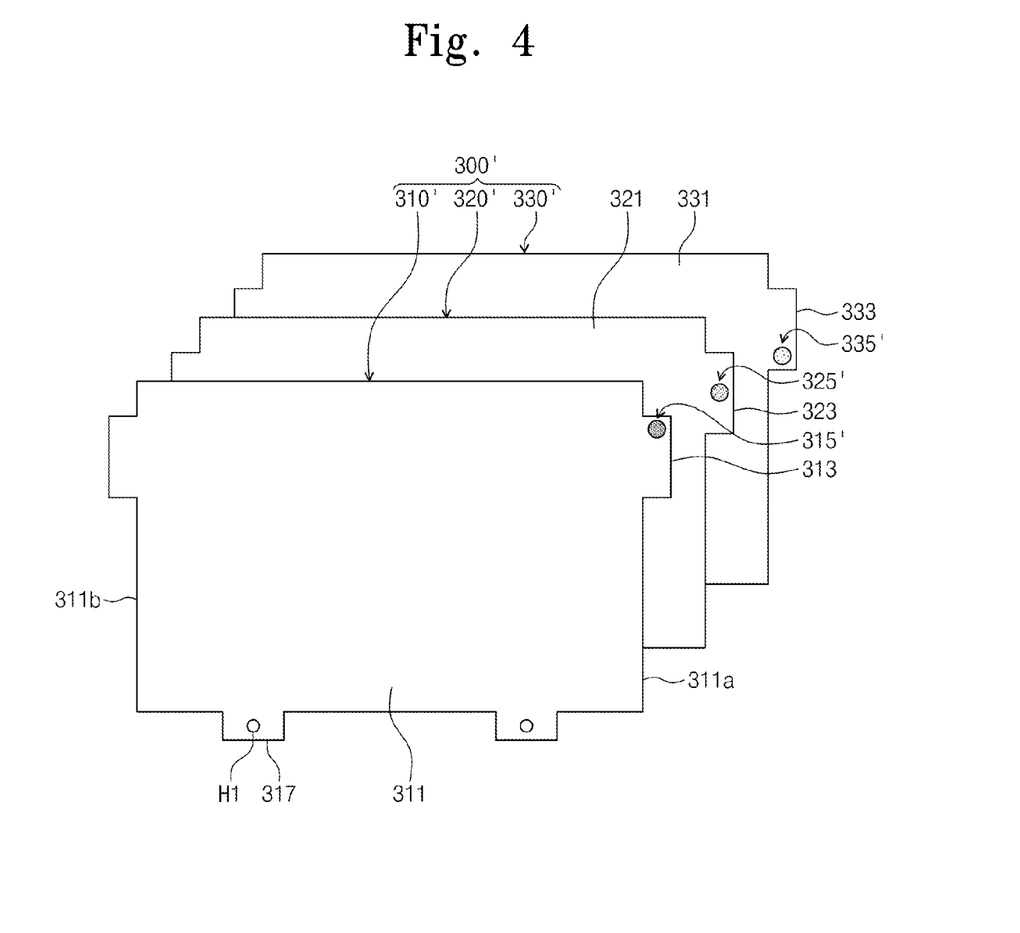
FIG. 4 illustrates a top plan view of optical sheets according to one or more embodiments of the invention.

FIG. 4 illustrates a top plan view of optical sheets according to one or more embodiment of the invention.

Referring to FIG. 4, optical sheets 310', 320', and 330' (collectively referred to as 300') may be analogous to optical sheets 310, 320, and 330 discussed with reference to FIGS. 1 to 3 except for distinction units 315', 325', and 335', which include colors instead of numbers.

The first distinction unit 315' may show a first color, the second distinction unit 325' may show a second color and may not overlap the first distinction unit 315' when the second optical sheet 320' overlaps the first optical sheet 310' in the back light assembly 1000, and the third distinction unit 335' may show a third color and may not overlap either of the first distinction unit 315' and the second distinction unit 325' when the third optical sheet 330' overlaps either of the first optical sheet 310' and the second optical sheet 320' in the backlight assembly 1000. In one or more embodiments, the first color, the second color, and the third color may be the same color. In one or more embodiments, the first color, the second color, and the third color may be three different colors. In one or more embodiments, the first color, the second color, and the third color may have the same luminosity and/or may have the same saturation.

Figure 5:
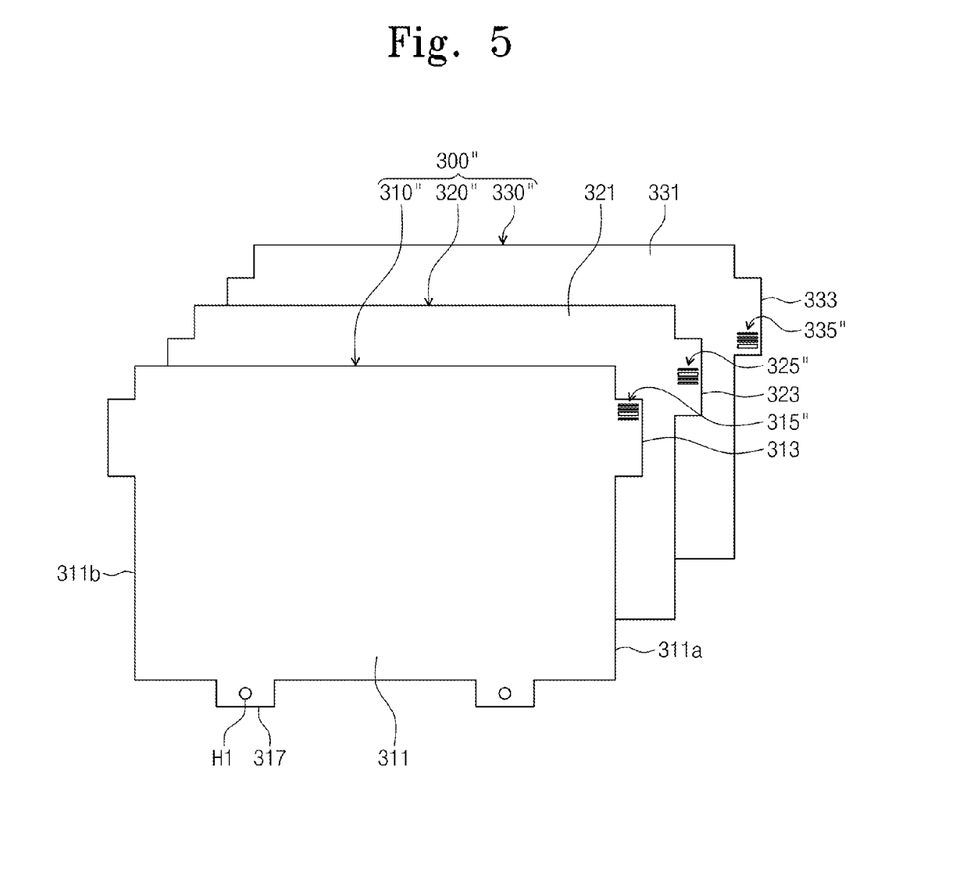
FIG. 5 illustrates a top plan view of optical sheets according to one or more embodiments of the invention.

FIG. 5 illustrates a top plan view of optical sheets according to one or more embodiments of the invention.

Referring to FIG. 5, optical sheets 310", 320", and 330" (collectively referred to as 300") may be analogous to optical sheets 310, 320, and 330 discussed with reference to FIGS. 1 to 3 except for distinction units 315", 325", and 335", which include barcodes instead of numbers.

The first distinction unit 315" may include a first barcode, the second distinction unit 325" may include a second barcode and may not overlap the first distinction unit 315' when the second guide unit 323 completely overlaps the first guide unit 313, and the third distinction unit 335" may include a third barcode and may not overlap either of the first distinction unit 315" and the second distinction unit 325" when the third guide unit 333 completely overlaps either of the first guide unit 313 and the second guide unit 323.

In one or more embodiments, The first barcode, the second barcode, and the third barcode may have different shapes and/or may have different configurations. In one or more embodiments, the first barcode, the second barcode, and the third barcode may have the same luminosity and/or may have the same saturation.

According to one or more embodiments, a worker may check the barcodes of the distinction units 315", 325", and 335" using a barcode reader to verify that correct optical sheets have been installed and to verify that the optical sheets have been stacked in the correct order.

Figure 6:
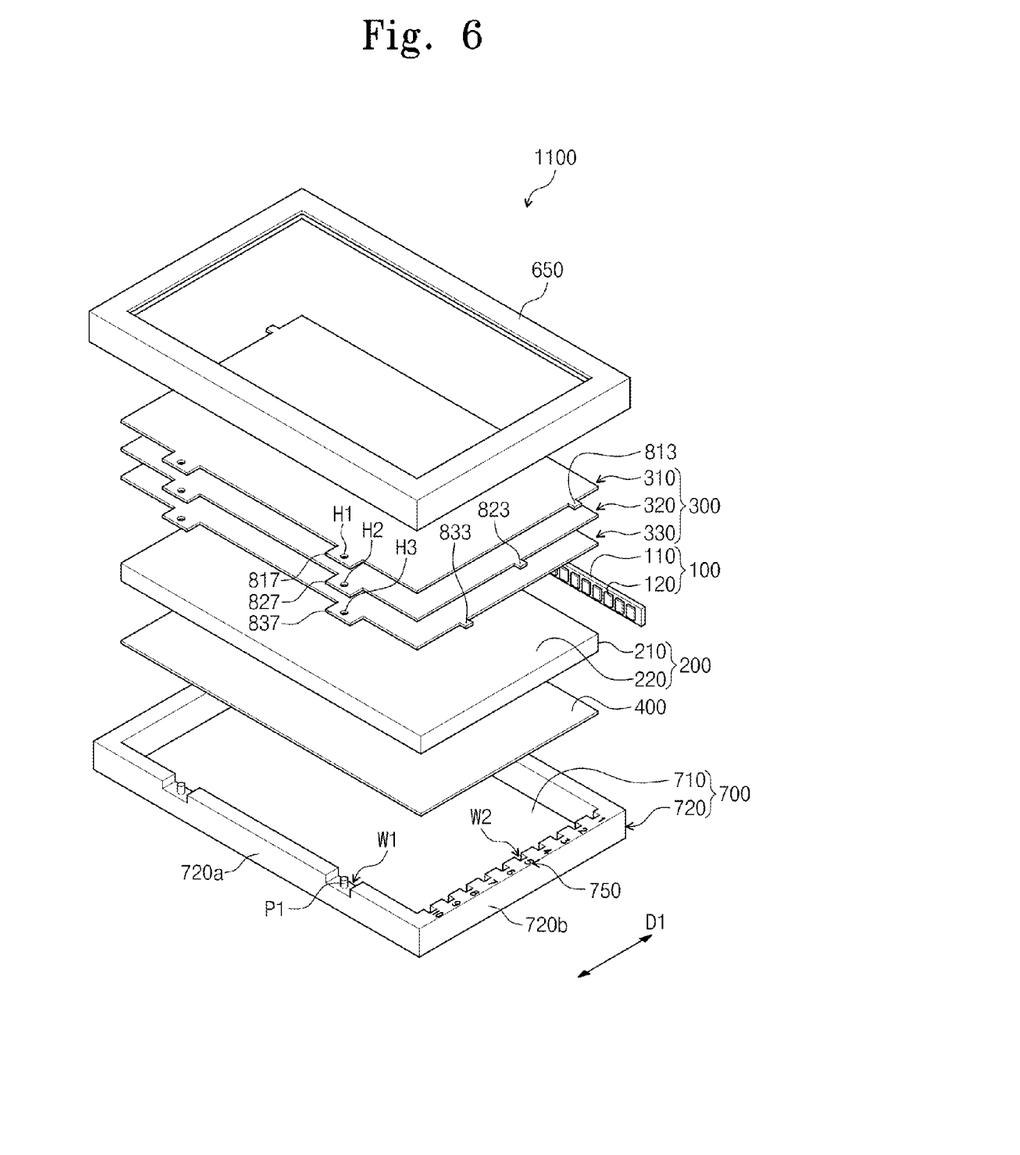
FIG. 6 illustrates an exploded perspective view of a backlight assembly according to one or more embodiments of the invention.
Figure 7:
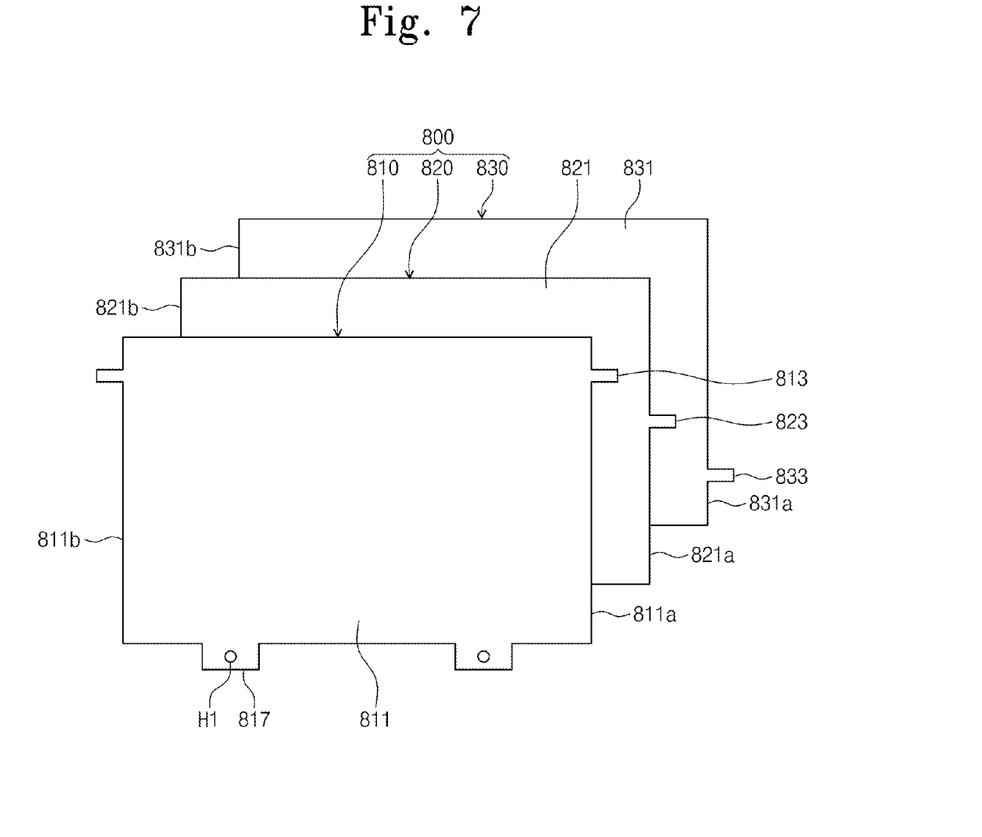
FIG. 7 illustrates a top plan view of optical sheets illustrated in FIG. 6.
Figure 8:
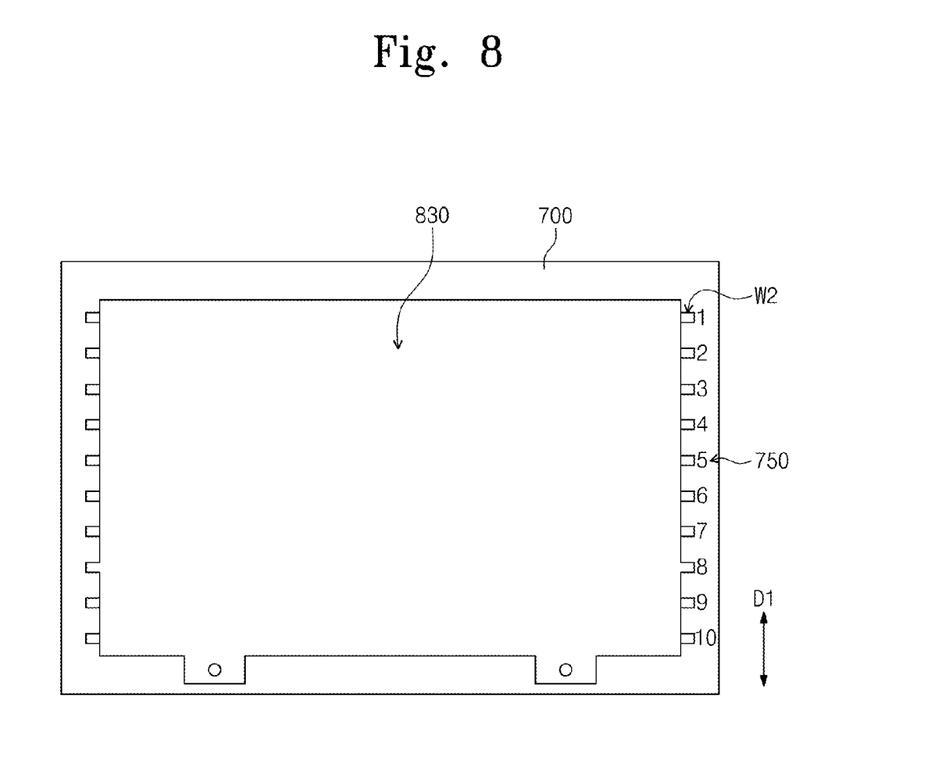
FIG. 8 illustrates a top plan view showing a combination of the optical sheets and a bottom chassis illustrated in FIG. 6.

FIG. 6 illustrates an exploded perspective view of a backlight assembly 1100 according to one or more embodiments of the invention. FIG. 7 illustrates a top plan view of optical sheets illustrated in FIG. 6. FIG. 8 illustrates a top plan view showing a combination of the optical sheet illustrated in FIG. 6 and a bottom chassis illustrated in FIG. 6.

Elements of the backlight assembly 1100 described with reference to FIGS. 6 to 8 may be substantially analogous to elements of the backlight assembly 1000 illustrated in FIG. 1 except for a mold frame 650, a bottom chassis 700 and optical sheets 800. The mold frame 650 may have a configuration that is similar to the configuration of the mold frame 600 discussed with reference to FIGS. 1 and 3. Nevertheless, the mold frame 650 does not have an opening for exposing guide units 813, 823, and 833 that is similar to the opening OP of the mold frame 600. Therefore, the mold frame 650 covers the guide units 813, 823, and 833 and coupling units 817, 827, and 837.

The optical sheets 800 may include a first optical sheet 810, a second optical sheet 820, and a third optical sheet 830.

The first optical sheet 810 may be a condensing sheet, the second optical sheet 820 may be a prism sheet, and the third optical sheet 830 may be a diffusion sheet.

In one or more embodiments, the backlight assembly 110 and/or the optical sheets 800 may include at most two optical sheets or may include four or more optical sheets, if necessary.

The first optical sheet 810 may include a first base film 811 and a first guide unit 813.

The first base film 811 may diffuse light provided from the light guide panel 200. The first base film 811 may have a rectangle shape having four sides, including a side 811a and a side 811b.

At least one first-optical-sheet guide unit 813 (or first guide unit 813 for conciseness) may be disposed at (and/or may protrude from) at least one of the sides 811a and 811b of the first base film 811. In one or more embodiments, as illustrated in FIGS. 6 and 7, two first guide units 813 may be disposed at and may protrude from the two opposite sides 811a and 811b of the first base film 811. A first guide unit 813 may match (and/or may be disposed inside) a corresponding structure of the bottom chassis 700 (e.g., a recess W2) to secure the first optical sheet 810 in place.

The first optical sheet 810 may further include at least one first-optical-sheet coupling unit 317 (or first coupling unit 817 for conciseness). The first coupling unit 817 may be disposed at (and/or may protrude from) a side of the base film 811 that is different from at least one of the sides 811a and 811b of the first base film 811, where at least one first guide unit 813 is disposed. A first coupling hole H1 is formed at the first coupling unit 817. The first coupling unit 817 may match (and/or may be disposed inside) a corresponding structure of the bottom chassis 700 (e.g., a recess W1) with the first coupling hole H1 matching (and/or receiving) a corresponding element of the bottom chassis 500 (e.g., a coupling projection P1) to secure the first optical sheet 310 in place.

The second optical sheet 820 includes a second base film 821, a second guide unit 823, and a second coupling unit 827. The third optical sheet 830 includes a third base film 831, a third guide unit 833, and a third coupling unit 837.

Each of the second optical sheet 820 and the third optical sheet 830 may have the same shape as the first optical sheet 310, except for a guide unit.

At least one second-optical-sheet guide unit 823 (or second guide unit 823 for conciseness) may be disposed at (e.g., may protrude from and/or abut) at least one of sides 821a and 821b of the second base film 821. The second guide unit 823 protruding from and/or abutting the side 821a of the second base film 821 is spaced from and does not overlap the first guide unit 813 protruding from and/or abutting the side 811a of the first base film 811 when the second base film 821 completely overlaps the first base film 811. That is, protruding positions of the first guide unit 813 and the second guide unit 823 are different from each other at the first base film 811 and the second base film 821.

At least one third-optical-sheet guide unit 833 (or third guide unit 833 for conciseness) may be disposed at (or may protrude from) at least one of sides 831a and 831b of the third base film 831. The third guide unit 833 protruding from and/or abutting the side 831a of the third base film 831 is spaced from and does not overlap the first guide unit 813 protruding from and/or abutting the side 811a of the first base film 811 and the second guide unit 823 protruding from and/or abutting the side 821a of the second base film 821 when viewed from the top the third base film 831 completely overlaps the second base film 821 and completely overlaps the first base film 811. That is, protruding positions of the guide units 813, 823, and 833 are different from one another at the base films 811, 821, and 831.

The bottom chassis 700 includes a bottom surface 710 and sidewalls 720 oriented substantially perpendicular to the bottom surface 710. The bottom chassis 700 has a storage space formed by the bottom surface 710 and the sidewalls 720. The bottom chassis 700 may receive and/or may contain a light source unit 100, a light guide panel 200, optical sheets 300, and a reflection plate 400 inside the storage space.

A first recess W1 may be formed on a top surface of a sidewall 720a of the bottom chassis 700 and may correspond to the coupling units 817, 827, and 837 for receiving the coupling units 817, 827, and 837. A coupling projection P1 may be formed at the first recess W1 and may correspond to the coupling holes H1, H2, and H3. The coupling projection P1 may be inserted into (and inserted through) the coupling holes H1, H2, and H3 sequentially.

A second recess W2 may be formed on a top surface of a sidewall 720b of the bottom chassis 700, wherein the sidewall 720b of the bottom chassis 700 may be disposed substantially perpendicular to the sidewall 720a of the bottom chassis 700 The second recess W2 may correspond to the units 813, 823, and 833 for receiving the guide units 813, 823, and 833. The guide units 813, 823, and 833 may be sequentially disposed inside the second recess W2. In one or more embodiments, as illustrated in FIGS. 6 to 8, the bottom chassis 700 may have a number of recesses W2 disposed on the sidewall 720b (e.g., ten second recesses W2 disposed on the sidewall 720b) that is greater than the number of the optical sheets 800 (e.g., 3).

In one or more embodiments, as illustrated in FIG. 8, a sidewall of the bottom chassis 700 that is opposite the other sidewall 720b of the bottom chassis 700 also may have a number of recesses (e.g., 10) that is greater than the number of optical sheets 800 (e.g., 3).

As illustrated in FIGS. 6 and 8, a plurality of signs 750 may be marked on the top surface of the sidewall 720b, which including second recesses W2 corresponding to the guide units 813, 823, and 833. The signs 750 may be marked adjacent to the second recesses W2. Each sign 750 may correspond to a second recess W2. At least some of the signs 750 may be marked adjacent to the guide units 813, 823, and 833. The signs 750 may be marked along a length direction D1 of the sidewall 720b. A sign 750 may include a character, a number, a color element, and/or a barcode. As illustrated in FIGS. 6 and 8, each of the signs 750 is a number.

A worker may verify whether optical sheets have been correctly selected and may determine whether the optical sheets have been stacked in the correct order based on the guide units 813, 823, and 833 and their corresponding signs 750. For example, the third guide unit 833 may correspond to the sign 750 that includes the number "8", as illustrated in FIGS. 6 and 8. Thus, according to embodiments of the invention, a failure rate associated with incorrect assembly of the optical sheets 800 may be minimized.

Figure 9:
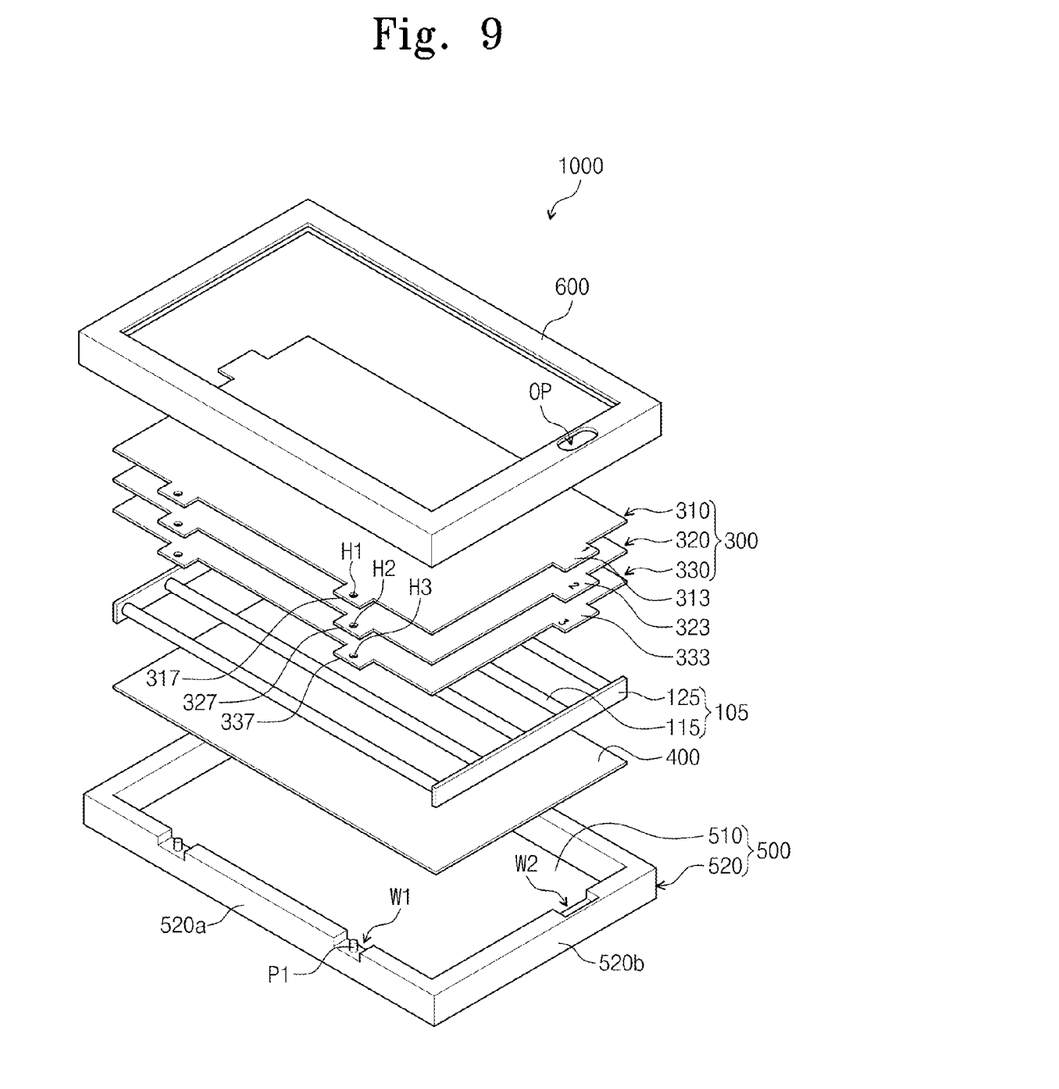
FIG. 9 illustrates an exploded perspective view of a backlight assembly according to one or more embodiments of the invention.

FIG. 9 illustrates an exploded perspective view of a backlight assembly 1200 according to one or more embodiments of the invention.

Elements of the backlight assembly 1200 illustrated in FIG. 9 may be substantially analogous to elements of the backlight assembly 1000 explained with reference to FIGS. 1 to 3, except for that the backlight assembly 1200 may not include a light guide panel but may include a direct-type light source unit 105. Referring to FIG. 9. The light source unit 105 is disposed between optical sheets 300 and a reflection plate 400.

The light source unit 105 may include a plurality of light sources 115 and a plurality of light source holders 125. The light sources 115 may be spaced from each other at regular intervals. The light sources 115 may provide light toward the optical sheets 300. The light source holders 125 may be connected to two ends of each of the light source and may be disposed on the reflection plate 400.

The light sources 115 may include one or more of a light emitting diode (LED), a cold cathode fluorescent lamp (CCFL), and a flat fluorescent lamp (FFL).

According to embodiments of the invention, a worker may recognize distinction units provided at optical sheets to distinguish kinds of optical sheets and to determine whether correct optical sheets have been placed inside a bottom chassis. In addition, the worker may recognize luminosities of the distinction units to verify whether optical sheets have been stacked in a correct order. Thus, a failure rate associated with incorrect assembly of optical sheets can be advantageously minimized.

While the invention has been particularly shown and described with reference to embodiments thereof, it will be apparent to those of ordinary skill in the art that various changes in form and detail may be made therein without departing from the spirit and scope of the invention as defined by the following claims.

What is claimed is:

1. A backlight assembly comprising:
   at least one light source;
   a light guide panel for guiding light provided from the light source and for emitting guided light in an emission direction;
   a first optical sheet disposed on the light guide panel, wherein a first sign is marked on the first optical sheet;
   a second optical sheet disposed on the first optical sheet, wherein a second sign differing from the first sign is marked on the second optical sheet;
   wherein the first sign does not overlap the second sign in the emission direction,
   a chassis containing the light source, the light guide panel, the first optical sheet, and the second optical sheet; and
   a frame covering the chassis and at least a portion of edges of the first optical sheet and the second optical sheet and having a hole exposing the first sign and the second sign simultaneously.

2. The backlight assembly as set forth in claim 1, wherein the first optical sheet comprises:
   a first base film; and
   a first guide unit protruding at a side surface of the first base film,
   wherein the first sign is marked in a partial area of the first guide unit.

3. The backlight assembly as set forth in claim 2, wherein the second optical sheet comprises:
   a second base film; and
   a second guide unit protruding at a side surface of the second base film and overlapping the first guide unit in the emission direction,
   wherein the second sign is marked in a partial area of the second guide unit and is spaced apart from the first sign in a plan view of the backlight assembly.

4. The backlight assembly as set forth in claim 1, wherein each of the first and second signs is one of a number, a character, a colored mark, and a barcode.

5. The backlight assembly as set forth in claim 3, wherein the second sign is more clearly recognizable than the first sign.

* * * * *